(12) United States Patent
Yamada

(10) Patent No.: US 10,150,271 B2
(45) Date of Patent: Dec. 11, 2018

(54) PRESS MACHINE AND METHOD OF CONTROLLING PRESS MACHINE

(71) Applicant: KOMATSU INDUSTRIES CORPORATION, Kanazawa-shi, Ishikawa (JP)

(72) Inventor: Yukihiro Yamada, Kawakita-machi (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 727 days.

(21) Appl. No.: 14/761,347

(22) PCT Filed: Feb. 4, 2014

(86) PCT No.: PCT/JP2014/052513
§ 371 (c)(1),
(2) Date: Jul. 16, 2015

(87) PCT Pub. No.: WO2014/125962
PCT Pub. Date: Aug. 21, 2014

(65) Prior Publication Data
US 2015/0352799 A1    Dec. 10, 2015

(30) Foreign Application Priority Data
Feb. 12, 2013    (JP) .................................. 2013-024010

(51) Int. Cl.
*B30B 15/14*    (2006.01)
*B30B 1/26*     (2006.01)
(Continued)

(52) U.S. Cl.
CPC ............ *B30B 15/148* (2013.01); *B30B 1/266* (2013.01); *H02H 7/08* (2013.01); *H02P 25/032* (2016.02);
(Continued)

(58) Field of Classification Search
CPC ..... B30B 15/148; B30B 15/26; B30B 15/281; B30B 1/266; H02P 25/032; H02P 29/027;
(Continued)

(56) References Cited

U.S. PATENT DOCUMENTS 3,884,068 A * 5/1975 Dybel ....................... G01L 1/16
                                                      73/771
5,717,433 A * 2/1998 Doba ................... G06F 3/04886
                                                     345/173
(Continued)

FOREIGN PATENT DOCUMENTS

CN    201177151 Y    1/2009
CN    101674930 A    3/2010
(Continued)

OTHER PUBLICATIONS

Office Action for the corresponding Chinese patent application No. 201480003743.2, dated Dec. 29, 2015.
(Continued)

*Primary Examiner* — Jimmy T Nguyen
*Assistant Examiner* — Gregory Swiatocha
(74) *Attorney, Agent, or Firm* — Global IP Counselors, LLP

(57) ABSTRACT

A press machine includes a servo amplifier configured to supply a drive current to a servo motor, a current detector for detecting the drive current, a rotational angle detector for detecting a rotational angle of a rotary motion provided by the servo motor, and a controller. The controller is configured to set a press production speed by setting a correspondence between rotational angles and rotational speeds at the rotational angles, which defines the rotary motion. The controller is configured to determine whether or not the drive current detected by the current detector is greater than or equal to a first threshold. The controller is configured to reduce all the rotational speeds by an equal ratio when the drive current detected by the current detector is greater than or equal to the first threshold.

15 Claims, 7 Drawing Sheets

(51) Int. Cl.
*B30B 15/28* (2006.01)
*H02P 29/024* (2016.01)
*H02P 25/032* (2016.01)
*H02P 29/032* (2016.01)
*H02H 7/08* (2006.01)

(52) U.S. Cl.
CPC .......... *H02P 29/027* (2013.01); *H02P 29/032* (2016.02); *B30B 15/281* (2013.01)

(58) Field of Classification Search
CPC .......... H02P 29/032; H02P 23/00; H02H 7/08; G05B 11/01; G05B 11/011
See application file for complete search history.

(56) References Cited

U.S. PATENT DOCUMENTS 6,021,712 A * 2/2000 Harrop .................. B30B 9/3007
100/229 A
6,337,042 B1 * 1/2002 Nakashima ............. B30B 15/14
264/297.8
2002/0096060 A1 * 7/2002 Kohno .................... B30B 1/186
100/35
2003/0116037 A1 * 6/2003 Tanaka ................ B30B 15/0041
100/282

FOREIGN PATENT DOCUMENTS

| | | |
|---|---|---|
| CN | 102380569 A | 3/2012 |
| JP | 4-70300 U | 6/1992 |
| JP | 5-138400 A | 6/1993 |
| JP | 2004-17122 A | 1/2004 |
| JP | 2004-58152 A | 2/2004 |
| JP | 2009-208134 A | 9/2009 |
| JP | 2010-221221 A | 10/2010 |

OTHER PUBLICATIONS

The International Search Report for the corresponding international application No. PCT/JP2014/052513, dated Apr. 8, 2014.

* cited by examiner

PRESS MACHINE AND METHOD OF CONTROLLING PRESS MACHINE

CROSS-REFERENCE TO RELATED APPLICATIONS

This application is a U.S. National stage application of International Application No. PCT/JP2014/052513, filed on Feb. 4, 2014. This U.S. National stage application claims priority under 35 U.S.C. § 119(a) to Japanese Patent Application No. 2013-024010, filed in Japan on Feb. 12, 2013, the entire contents of which are hereby incorporated herein by reference.

BACKGROUND

Field of the Invention

The present invention relates to a press machine and a method of controlling the press machine, particularly to an electric servo press and a method of controlling the electric servo press.

Background Information

An electric servo press as a type of press machine includes a servo motor, a power conversion mechanism, a slide and so forth. The power conversion mechanism is configured to convert the rotational driving power of the servo motor into the up-and-down reciprocating motion of the slide. Then, stamping of a workpiece is performed between an upper die and a lower die by the reciprocating motion of the slide.

In such an electric servo press, as described in Japan Laid-open Patent Application Publication No. 2004-058152, for instance, an operator is allowed to set beforehand target speeds for respective virtual rotational angles associated with slide positions. With such setting being done, the operator is capable of setting an optimal production speed.

In this regard, the electric servo press is more flexible than a well-known mechanical press machine using a flywheel. However, in some settings, a high load could act on the servo motor. When the press machine continues to be operated with such a setting being employed, a servo amplifier is inevitably overheated. This results in abnormal stop of the press machine.

In view of the above, as shown in Japan Laid-open Patent Application Publication No. 2004-017122, a technology has been developed that during an automatic operation, the cumulative amount of heat is calculated on the basis of past actually measured values including motor load current, and the slide is configured to be temporarily stopped when either the motor load current or the cumulative amount of heat exceeds a predetermined threshold.

SUMMARY

However, when the motor current exceeds the threshold during the press operation, it takes time to stop the press machine and perform a setting work again. Therefore, even when the motor current exceeds the threshold during the press operation, it is preferable in some cases to continue production without stopping the press machine.

It is an object of the present invention to provide a servo press machine that is capable of continuing production even when motor current exceeds a threshold during a press operation.

Solution to Problems

A press machine according to a first aspect of the present invention is a press machine configured to convert a rotary motion produced by a drive source into a reciprocating motion of a slide through a power conversion mechanism, and includes a servo motor, a servo amplifier, current detecting means, rotational angle detecting means, speed setting means, determination means and speed changing means. The servo motor is the drive source of the rotary motion. The servo amplifier is configured to supply a drive current to the servo motor. The current detecting means detects the drive current. The rotational angle detecting means detects a rotational angle of the rotary motion. The speed setting means sets a press production speed by setting a correspondence between rotational angles and rotational speeds at the rotational angles, which defines the rotary motion. The determination means determines whether or not the drive current detected by the current detecting means is greater than or equal to a first threshold. The speed changing means reduces all the rotational speeds set by the speed setting means by an equal ratio when the drive current detected by the current detecting means is greater than or equal to the first threshold.

The determination means may be configured to determine whether or not the drive current detected by the current detecting means is greater than or equal to the first threshold until the reciprocating motion is performed a predetermined number of times after starting of the reciprocating motion. Furthermore, the speed changing means may be configured to reduce all the rotational speeds set by the speed setting means by a predetermined ratio after the reciprocating motion is performed the predetermined number of times in case the determination means determines that the drive current is greater than or equal to the first threshold. The predetermined number of times is, for instance, once.

When a set including all the rotational speeds changed by the speed changing means is defined as a first speed set, the determination means may be configured to determine whether or not the drive current detected by the current detecting means is greater than or equal to the first threshold until the reciprocating motion is performed the predetermined number of times after a set including all the rotational speeds is changed into the first speed set. Furthermore, when the determination means determines that the drive current is greater than or equal to the first threshold, the speed changing means may be configured to reduce all the rotational speeds included in the first speed set by the predetermined ratio after the reciprocating motion is performed the predetermined number of times with the set including all the rotational speeds changed into the first speed set. The predetermined number of times is, for instance, once.

The aforementioned press machine may further include emergency stop means for stopping electric power supply to the servo motor when the drive current is greater than or equal to a second threshold greater than the first threshold.

The aforementioned press machine may further include display means for displaying the rotational angle at which the drive current is greater than or equal to the first threshold.

The display means may include a roulette displaying part indicating the rotational angle by a sector located on a circumference of a circle. Furthermore, the roulette displaying part is configured to highlight the sector indicating the rotational angle at which the drive current is greater than or equal to the first threshold.

The roulette displaying part may be configured to display the sector to be highlighted by changing a color of the sector.

The roulette displaying part may be configured to display the sector to be highlighted by blinking the sector.

The display means may further include a status displaying part and a production speed change history displaying part.

The status displaying part may be configured to display that the press production speed has been changed by the speed changing means. The production speed change history displaying part may be configured to display the press production speed set by the speed setting means and the press production speed changed by the speed changing means.

The aforementioned press machine may further include mode setting means for setting an action of the determination means and an action of the speed changing means to be enabled or disabled.

The mode setting means may be capable of selecting any one of a first mode for disabling both of the action of the determination means and the action of the speed changing means, a second mode for enabling only the action of the determination means and causing the display means to display the rotational angle at which the drive current is greater than or equal to the first threshold, and a third mode for enabling both of the action of the determination means and the action of the speed changing means.

The aforementioned press machine may further include threshold setting means for setting the first threshold.

The threshold setting means may further include means for authenticating an operator.

The predetermined ratio may be 1%.

A method of controlling a press machine according to a second aspect of the present invention is a method of controlling a press machine configured to convert a rotary motion produced by a servo motor into a reciprocating motion of a slide through a power conversion mechanism. The press machine includes a servo amplifier supplying a drive current to the servo motor. A press production speed is set by setting a correspondence between rotational angles and rotational speeds at the rotational angles, which defines the rotary motion. A press action is performed in accordance with the press production speed. The drive current is detected. Whether or not the detected drive current is greater than or equal to a first threshold is determined. All the set rotational speeds are reduced by an equal ratio when the detected drive current is greater than or equal to the first threshold.

Advantageous Effects of Invention

The press machine and the method of controlling the press machine according to the present invention are configured to reduce the drive current of the servo motor by reducing the press production speed even when the drive current is greater than or equal to the first threshold. As a result, the press machine is capable of continuing production even when the drive current of the servo motor is greater than or equal to the first threshold.

DETAILED DESCRIPTION OF EXEMPLARY EMBODIMENTS

Construction

Figure 1:
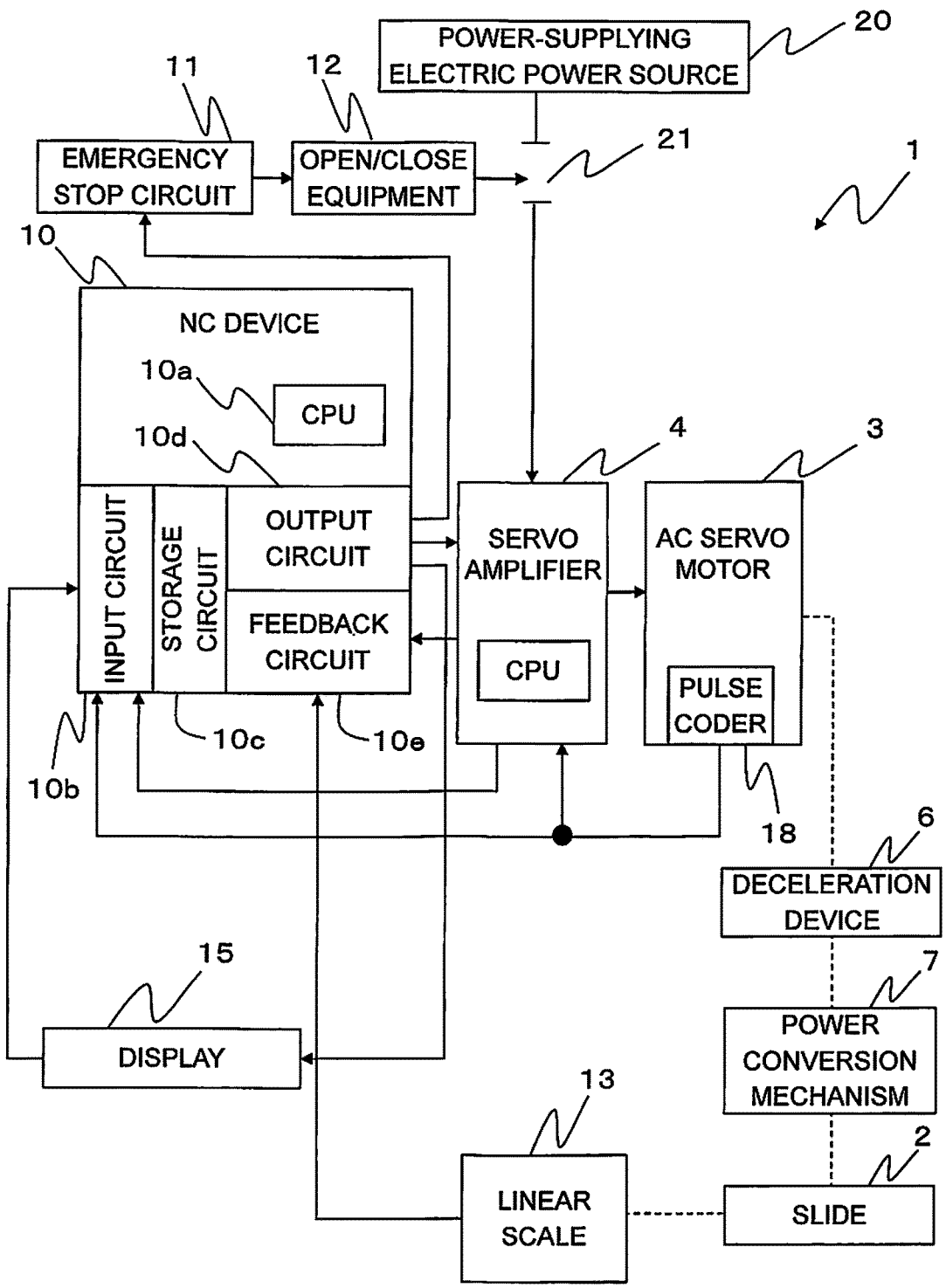
FIG. 1 is a system block diagram of a press machine according to an exemplary embodiment of the present invention.

FIG. 1 is a block diagram of an electric servo press according to an exemplary embodiment of the present invention. The present electric servo press 1 includes a slide 2, an AC servo motor 3 and a servo amplifier 4. A deceleration device 6 and a power conversion mechanism 7, which are widely known, are mounted between the AC servo motor 3 and the slide 2. For example, a drum type, an eccentric type, a link type and so forth have been known as types of the power conversion mechanism 7.

Figure 2:
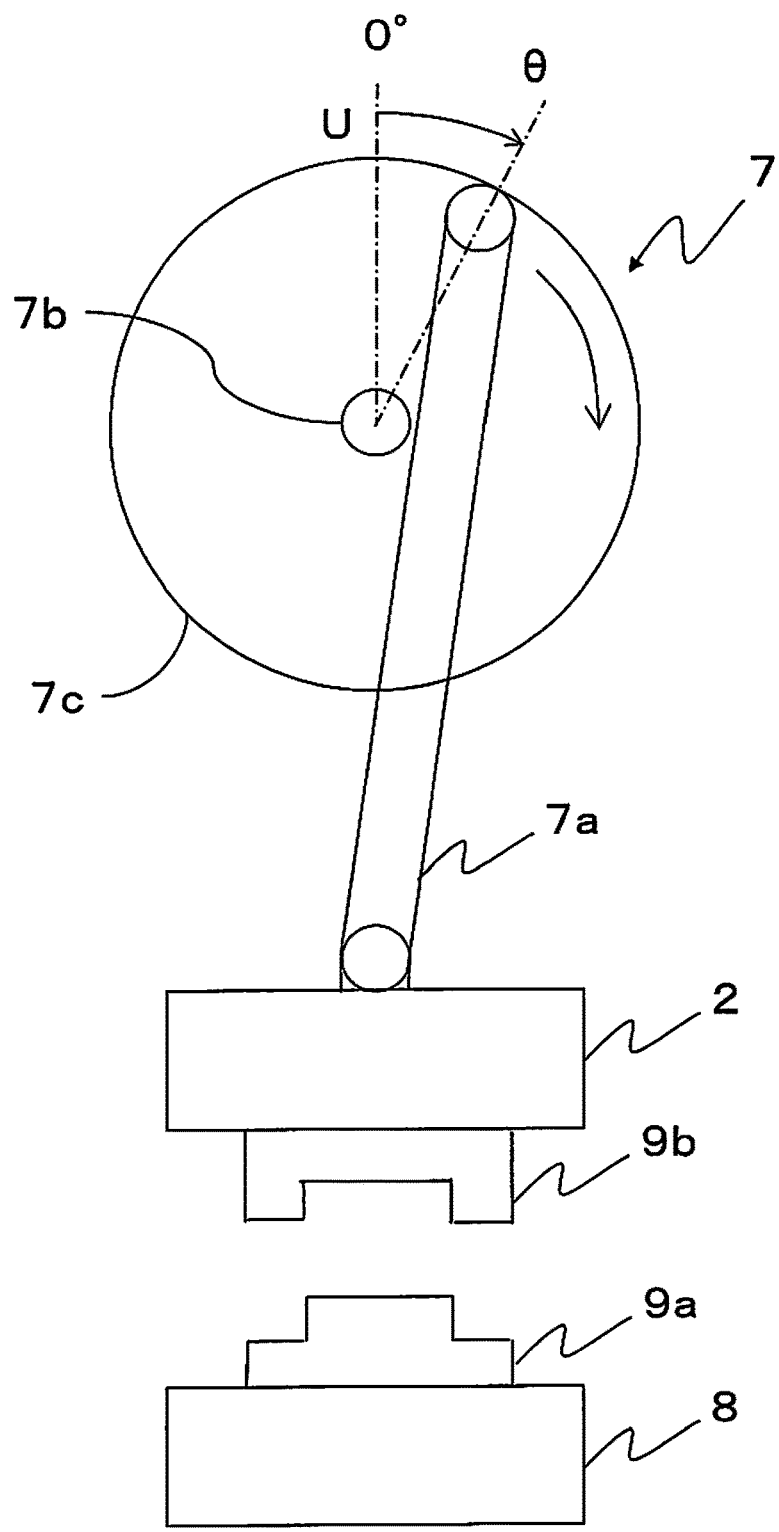
FIG. 2 is a diagram explaining an action of a power conversion mechanism.

FIG. 2 is a diagram for explaining an action of the power conversion mechanism 7. In the electric servo press 1, a lower die 9a is fixed onto a bolster 8 installed on a base (not shown in the drawing). An upper die 9b, paired with the lower die 9a, is fixed to the slide 2 over the lower die 9a. The slide 2 is connected to a rotor 7c configured to be rotated about a shaft 7b through an arm 7a. It should be noted that the rotor 7c is schematically illustrated. The slide 2 is supported by a body frame (not shown in the drawing) so as to be movable up and down. The shaft 7b is an output member of the deceleration device 6 and is configured to be driven and rotated by the AC servo motor 3.

Additionally, the present electric servo press 1 includes a numerically controlled (NC) device 10, an emergency stop circuit 11, an open/close equipment 12 and a linear scale 13.

The NC device 10 includes a central processing unit (CPU) 10a, an input circuit 10b, a storage circuit 10c, an output circuit 10d, a feedback circuit 10e and so forth. A display 15 and a pulse coder 18 for detecting rotation of a servo motor 3 are connected to the input circuit 10b. Additionally, a servo alarm is configured to be inputted into the input circuit 10b from the servo amplifier 4. The servo alarm is configured to be outputted when the drive current of the AC servo motor 3 exceeds a predetermined threshold (referred to as "a second threshold" in the following explanation). A variety of preliminarily set parameters and programs are stored in the storage circuit 10c. A signal from the output circuit 10d is configured to be inputted into the servo amplifier 4 and the emergency stop circuit 11. On the other hand, a signal from the servo amplifier 4 (a drive current from the AC servo motor 3) is inputted into the feedback circuit 10e. The NC device 10 causes the CPU 10a to run a program stored in the storage circuit 10c to calculate the rotational angle of the rotor 7c (a clockwise angle θ from a top dead center U in FIG. 2) with use of an output from the pulse coder 18 on an as-needed basis. Additionally, the NC device 10 causes the CPU 10a to run a program stored in the storage circuit 10c to perform processing of determining whether or not the drive current of the AC servo motor 3 exceeds a predetermined threshold smaller than the second threshold (in the following explanation, the predetermined threshold will be referred to as "a first threshold", and it should be noted that the first threshold indicates the maximum current of the AC servo motor 3, e.g., a rated current value, that enables a continuous operation of the electric servo press 1). Moreover, the NC device 10 causes the CPU 10a to run a program stored in the storage circuit 10c to perform processing of changing the production speed when the drive current of the AC servo motor 3 is greater than or equal to the first threshold. The determination processing and the production speed change processing will be described below in detail.

The open/close equipment 12 is connected to the output side of the emergency stop circuit 11. Additionally, a switch 21 of a normal open type is provided for and mounted between a power-supplying electric power source 20 and the servo amplifier 4. The switch 21 is configured to be closed by the open/close equipment 12 to be controlled by the emergency stop circuit 11.

The linear scale 13 is configured to detect the absolute position of the slide 2. A signal from the linear scale 13 is configured to be inputted into the feedback circuit 10e of the NC device 10. The NC device 10 is configured to output a control signal to the servo amplifier 4 on the basis of the feedback signal so as to position the slide 2.

A set of display data is configured to be outputted to the display 15 from the output circuit 10d of the NC device 10. The display 15 is configured to display the present production speed, the present position of the slide 2 and so forth, and in addition, display an activation button, a speed setting picture, a production speed limited status display screen to be displayed in reducing the production speed when the drive current of the servo motor is greater than or equal to the first threshold, and so forth. The display 15 is a monitor preferably having a touch panel. It should be noted that the display 15 may be additionally equipped with an activation switch and a variety of switches, keys and so forth for performing a variety of inputs such as speed setting, mode setting (to be descried in detail) and so forth.

Slide Motion Setting Operation

In operating the electric servo press 1, an operator firstly sets the production speed by operating the touch panel and so forth of the display 15. Setting of the production speed is, for instance, setting of the number of steps described in the aforementioned PTL 1, setting of correspondence between target angles in the respective steps and rotational speeds of the rotor 7c at the respective target angles, and so forth. Table 1 shows an example of the setting. The target angle is herein indicated by the angle $\theta$ shown in FIG. 2. The rotational speed is set as a ratio (0% to 100%) to a rotational speed to be achieved by the allowable maximum speed of the AC servo motor 3. A variety of set values are stored in the storage circuit 10c. With the setting as described above, a slide motion (definition of a rotary motion) is defined.

TABLE 1

| STEP NUMBER | ANGLE | SPEED |
|---|---|---|
| 1 | 120° | 100% |
| 2 | 180° | 50% |
| 3 | 210° | 70% |
| 4 | 0° | 100% |

Production Speed Setting

When the slide motion is set, the press production speed, which is normally represented by the frequency of reciprocations of the slide 2 per minute (strokes/min: spm), is automatically calculated and is displayed on the display 15.

Mode Setting Operation

After the setting of the production speed, the operator operates the touch panel and so forth on an as-needed basis so as to set any of the modes to be described. The modes herein settable for the electric servo press 1 are the following three.

First mode: the determination processing and the production speed change processing are both disabled.

This is a mode in which the NC device 10 is configured not to perform both of the processing of determining whether or not the drive current of the AC servo motor 3 is greater than or equal to the first threshold and the processing of changing the production speed to be performed when the drive current of the AC servo motor 3 is greater than or equal to the first threshold. An action to be herein performed is substantially equivalent to that to be performed by a well-known electric servo press.

Second mode: only the determination processing is enabled whereas the production speed change processing is disabled.

This is a mode in which the NC device 10 is configured to perform only the processing of determining whether or not the drive current of the AC servo motor 3 is greater than or equal to the first threshold. In this mode, the display 15 is configured to display the rotational angle $\theta$ at which the drive current is greater than or equal to the first threshold.

Third mode: the determination processing and the production speed change processing are both enabled.

This is a mode in which the NC device 10 is configured to perform both of the processing of determining whether or not the drive current of the AC servo motor 3 is greater than or equal to the first threshold and the processing of changing the production speed to be performed when the drive current of the AC servo motor 3 is greater than or equal to the first threshold. Even in this mode, the display 15 is configured to display the rotational angle $\theta$ at which the drive current is greater than or equal to the first threshold.

Figure 3:
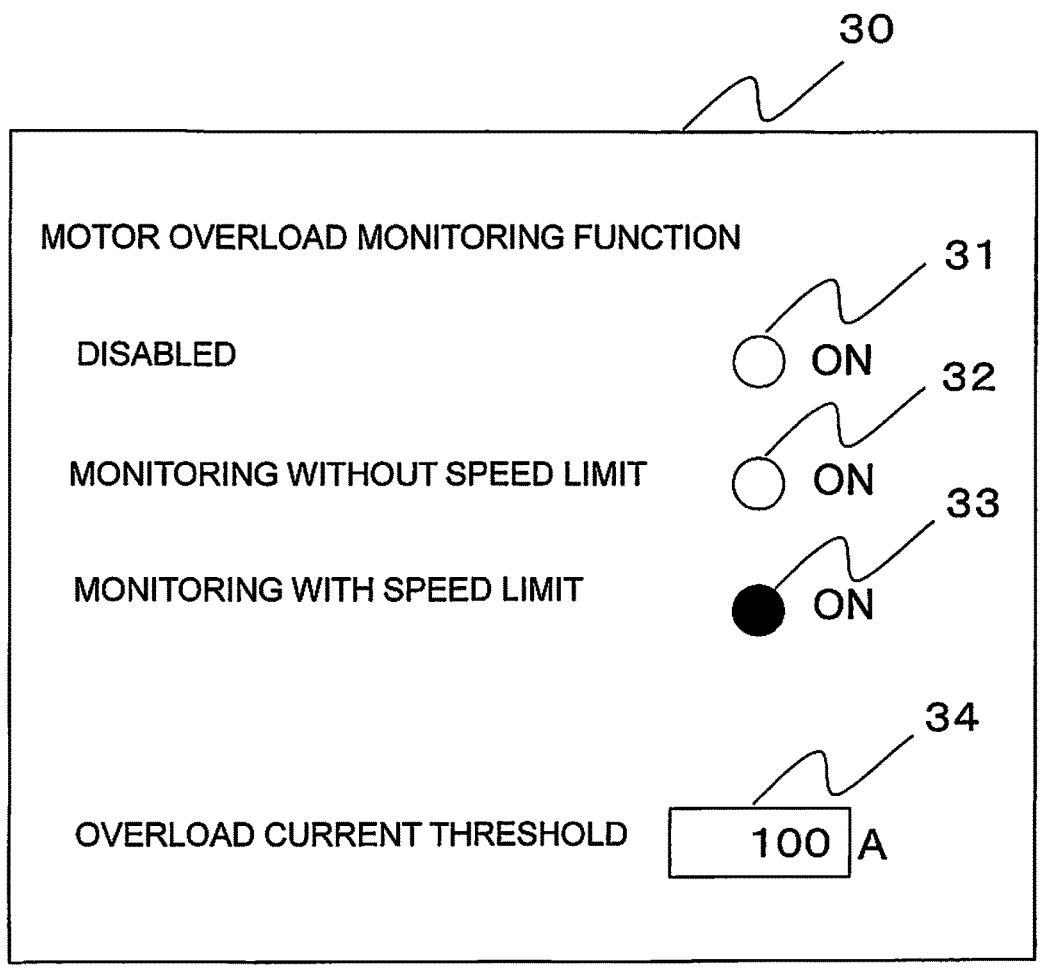
FIG. 3 is a diagram illustrating a picture shown by a display when an operator performs a mode setting operation.

FIG. 3 illustrates a picture shown by the display 15 when an operator performs a mode setting operation. The setting picture 30 includes radio buttons 31 to 33 and a text box 34. The radio button 31 is turned "ON" when the operator intends to set the electric servo press 1 to the aforementioned first mode. The radio button 32 is turned "ON" when the operator intends to set the electric servo press 1 to the aforementioned second mode. The radio button 33 is turned "ON" when the operator intends to set the electric servo press 1 to the aforementioned third mode. Any one of the radio buttons 31 to 33 is selected, and hence, plural ones of the radio buttons 31 to 33 are never simultaneously turned "ON". It should be noted that the radio buttons 31 to 33 are examples of graphic user interface (GUI), and another GUI enabling selecting one of three modes may be used.

The text box 34 is an interface for setting the aforementioned first threshold. The first threshold is preferably set by a maintenance operator of the electric servo press 1, not by a press operator. Therefore, only a person successfully authenticated is allowed to edit the text box 34. In other words, for example, the display 15 is configured to display a password entry screen when detecting a touch operation or so forth for the text box 34. Then, an edit screen of the text box 34 is configured to be displayed only when authentication is succeeded by entry of a password only known to the maintenance operator. Then, the maintenance operator edits the first threshold with use of the edit screen.

It should be noted that a general press operator is not allowed to edit the first threshold but is allowed to see the first threshold displayed in the picture. Therefore, the press operator can find the production speed with reference to the value of the fast threshold.

The mode set as described above and the first threshold are stored in the storage circuit 10c. It should be noted that the present setting operation may be omitted when the operator accepts default setting. For example, when the third mode is the default mode and the operator intends to actuate the electric servo press 1 in the third mode, the present setting operation is omitted.

Press Action

Figure 4:
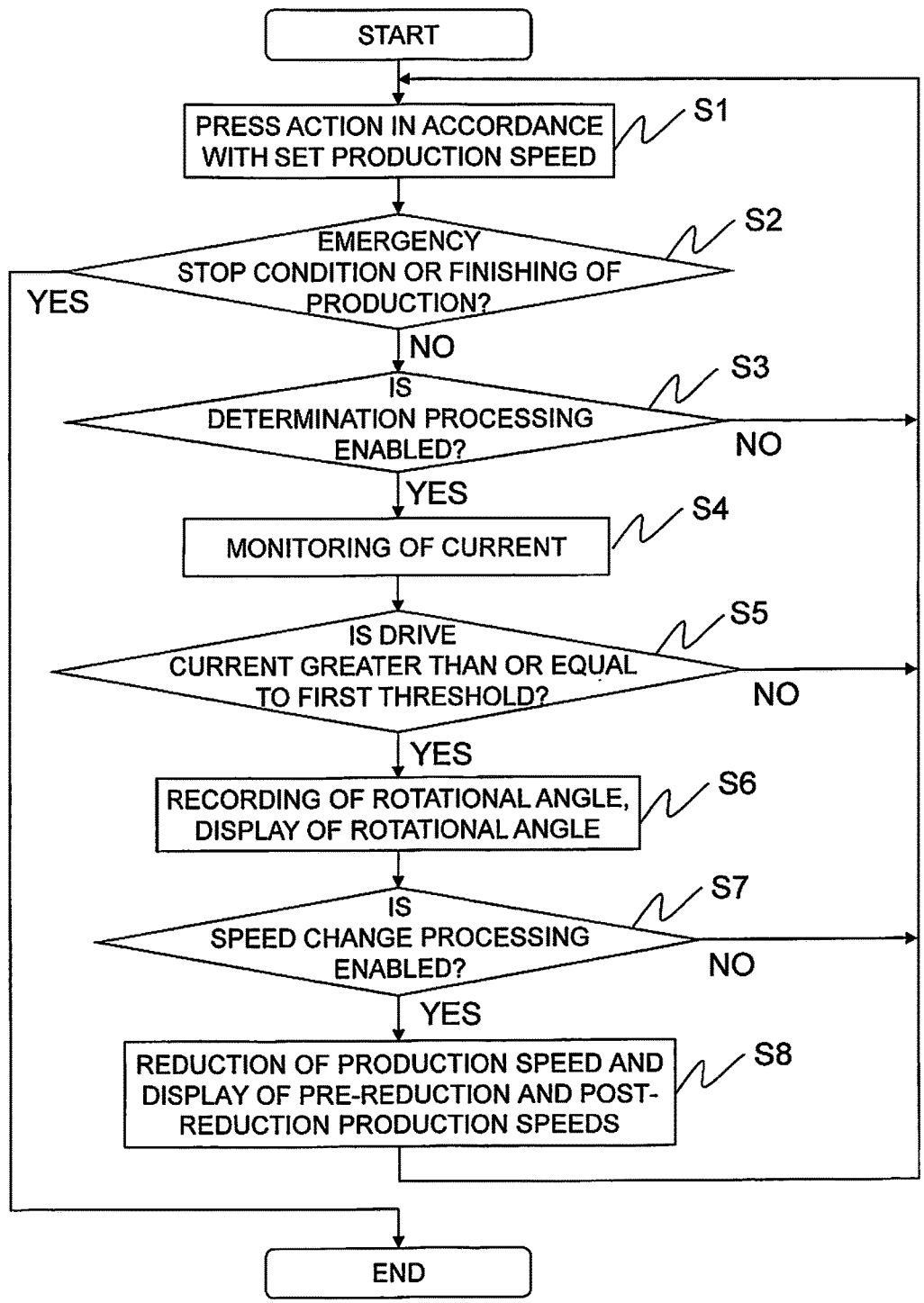
FIG. 4 is a flowchart of an action of an electric servo press according to the present exemplary embodiment.

When an operator operates the activation button after completion of the aforementioned setting work, a slide activation signal is inputted into the NC device 10. Accordingly, the switch 21 is closed and electric power is supplied to the servo amplifier 4. FIG. 4 is a flowchart of an action to be performed by the electric servo press 1 according to the present exemplary embodiment after the aforementioned activation operation.

When the slide activation signal is inputted into the NC device 10, the electric servo press 1 performs a press action in accordance with the set production speed (Step S1). Specifically, a speed command (a voltage command for instructing rotation of the servo motor 3) and a command for enabling control of the servo motor 3 are outputted from the output circuit 10d to the servo amplifier 4 on the basis of data for setting of a slide motion stored in the storage circuit 10c. Then, the servo amplifier 4 converts an electric power supplied by the power-supplying electric power source 20 into a drive electric power signal in accordance with the speed command, and outputs the drive electric power signal to the servo motor 3. On the other hand, a pulse signal is fed back to the servo amplifier 4 from the pulse coder 18 embedded in the servo motor 3. Then, the servo motor 3 is controlled by the servo amplifier 4 to reduce deviation between the speed command and the motor rotational speed (corresponding to the driving speed of the slide) to be calculated from the pulse signal. Then, a feedback signal from the linear scale 13 is inputted into the NC device 10 from the linear scale 13 through the feedback circuit 10e. Then, the NC device 10 outputs a control signal to the servo amplifier 4 on the basis of this feedback signal and the feedback signal of the drive current of the AC servo motor 3, and accordingly, the slide 2 is positioned in a target position.

When an emergency stop condition occurs or when production is finished (YES in Step S2), the electric servo press 1 finishes performing an action. The emergency stop condition refers to a condition that a stop signal from an emergency stop button (not shown in the drawings), a servo alarm from the servo amplifier 4, or so forth is inputted into the input circuit 10b during a press operation. When the emergency stop condition occurs, a stop signal is outputted from the NC device 10 to the emergency stop circuit 11. In response to the stop signal, a control signal is outputted from the emergency stop circuit 11 to the open/close equipment 12, and thereby, the switch 21 is opened. Hence, electric power supply to the servo amplifier 4 is blocked, and additionally, rotation of the servo motor 3 is stopped. It should be noted that similarly when finish of production is instructed by, for instance, an operation of a finish button by the operator, a deactivation signal is transmitted from the output circuit 10d to the servo amplifier 4, and thereby, rotation of the servo motor 3 is stopped.

When an emergency stop condition does not occur and production is not finished (No in Step S2), the following processing will be consecutively performed. First, the NC device 10 determines whether or not the determination processing is enabled with reference to the mode stored in the storage circuit 10c (Step S3). Specifically, when the mode stored in the storage circuit 10c is the first mode, the NC device 10 determines that the determination processing is disabled, and otherwise, the NC device 10 determines that the determination processing is enabled. When the determination processing is disabled (NO in Step S3), the processing returns to Step S1.

Figure 5:
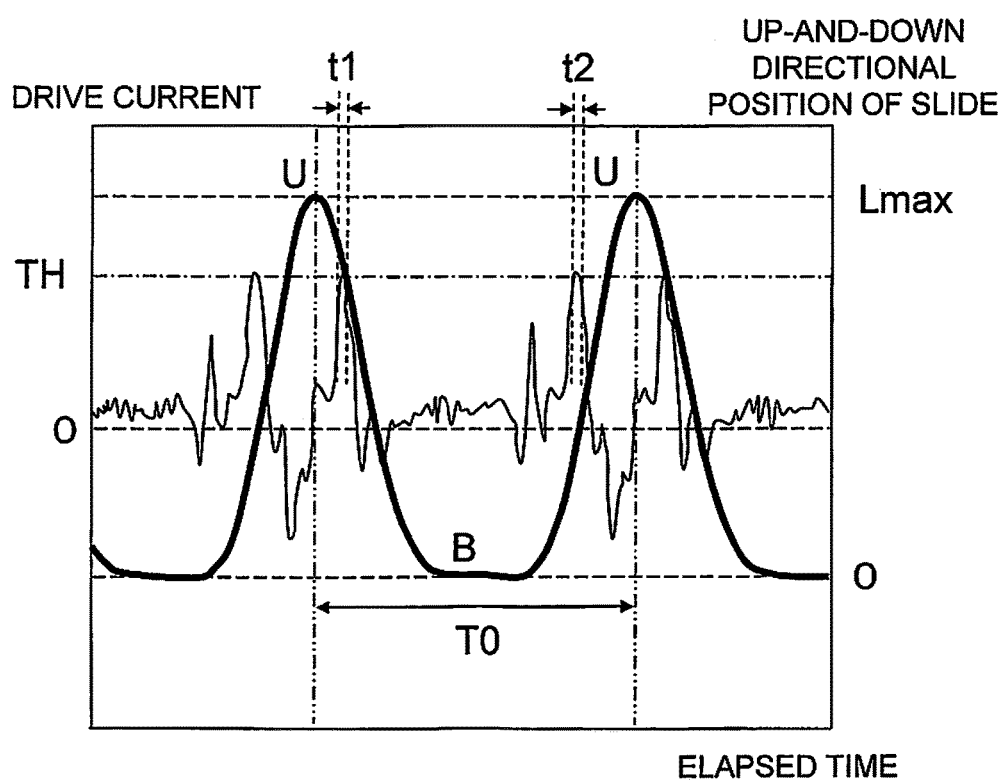
FIG. 5 is a chart illustrating a relation between a position of a slide and a drive current of an AC servo motor.

When the determination processing is enabled (YES in Step S3), the NC device 10 monitors the drive current of the AC servo motor 3 to be inputted into the feedback circuit 10e (Step S4). FIG. 5 is a chart illustrating a relation between the position of the slide 2 and the drive current of the AC servo motor 3 where the slide 2 is actuated at a preliminarily set production speed. In FIG. 5, the horizontal axis indicates time whereas the vertical axis indicates the up-and-down directional position of the slide 2 or the magnitude of drive current. In FIG. 5, a dashed dotted line indicates the first threshold. In the example of FIG. 5, the motor drive current is greater than or equal to the first threshold TH at a rotational angle (a period indicated by t1 in the drawing, θ≈30°) in the up-and-down directional position immediately after movement from the top dead center U to a bottom dead center B and at a rotational angle (a period indicated by t2 in the drawing, θ≈270°) in the up-and-down directional position around the midpoint in movement from the bottom dead center B to the top dead center U.

Next, the NC device 10 determines whether or not the drive current is greater than or equal to the first threshold (Step S5). When the drive current is less than the first threshold (NO in Step S5), the processing returns to Step S1. When the drive current is greater than or equal to the first threshold (YES in Step S5), the NC device 10 stores a rotational angle, at which the drive current is greater than or equal to the first threshold, in the storage circuit 10c. Then, the display 15 displays the rotational angle (Step S6). The method of displaying the rotational angle will be described below.

Next, the NC device 10 determines whether or not the speed change processing is enabled with reference to the mode stored in the storage circuit 10c (Step S7). Specifically, when the mode stored in the storage circuit 10c is the third mode, the NC device 10 determines that the speed change processing is enabled. Otherwise, the NC device 10 determines that the speed change processing is disabled. When the speed change processing is disabled (NO in Step S7), the processing returns to Step S1.

When the speed change processing is enabled (YES in Step S7), the NC device 10 performs processing of reducing the press production speed originally set by the operator until the drive current becomes less than the first threshold. Then, the display 15 displays the press production speed originally set by the operator and the reduced press production speed (Step S8). Specifically, reduction in press production speed refers to the following processing. First, processing of steps S1 to S7 are performed every time the reciprocating motion in the press action is performed a predetermined number of times (preferably once; it should be noted that the predetermined number of times may be other than once, such as ten times), and when the drive current is greater than or equal to the first threshold, the speeds set for the respective steps in the production speed setting operation are reduced by a constant ratio. The constant ratio is preferably 1% of the already set speed. Table 2 indicates exemplary production speeds when the speeds are reduced once where the aforementioned ratio is set to be 1% and the production speeds are set as shown in Table 1.

TABLE 2

| STEP NUMBER | ANGLE | SPEED |
| --- | --- | --- |
| 1 | 120° | 99% |
| 2 | 180° | 49.5% |
| 3 | 210° | 69.3% |
| 4 | 0° | 99% |

Figure 6:
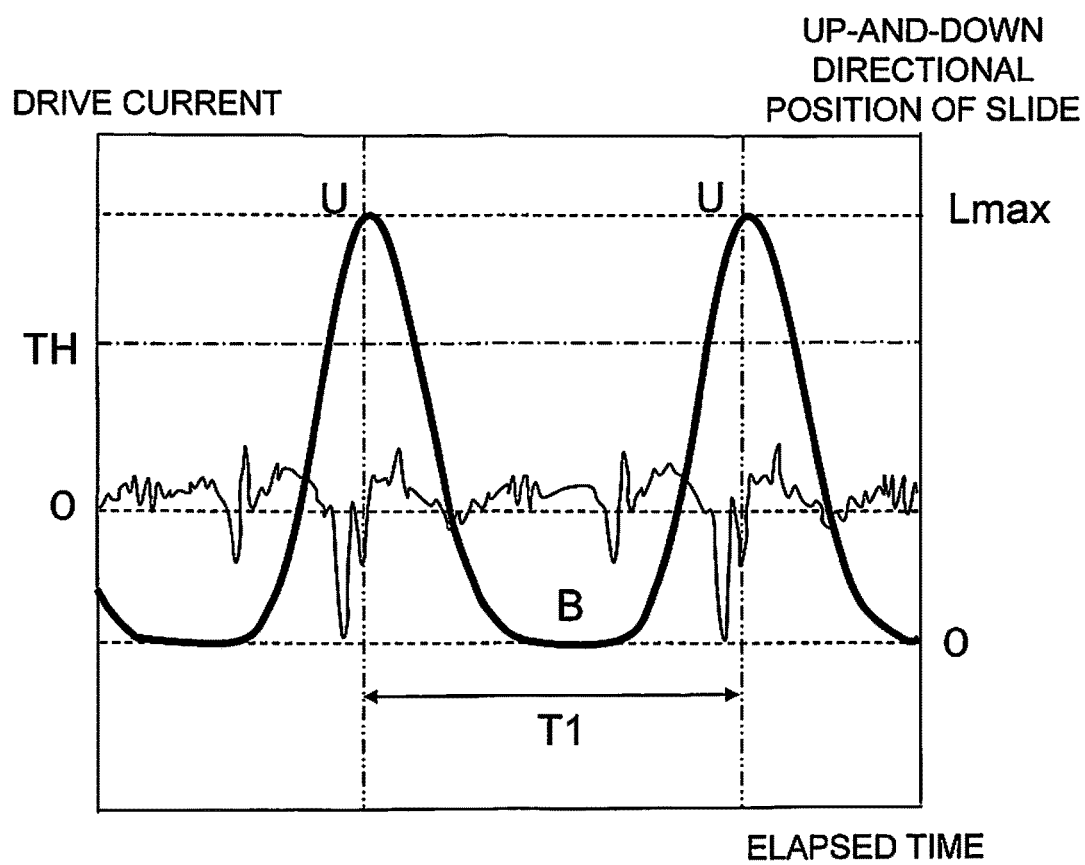
FIG. 6 is a chart illustrating the relation where a production speed is reduced in a driving condition of the AC servo motor as shown in FIG. 5.

The NC device 10 repeats performing the processing of steps S1 to S8 every time the reciprocating motion in the press action is performed a predetermined number of times (preferably once) until the drive current becomes less than the first threshold. FIG. 6 is a chart showing an exemplary situation where the production speed is reduced in the driving condition of the AC servo motor 3 as shown in FIG. 5. Similarly in FIG. 6, the horizontal axis indicates time, whereas the vertical axis indicates the up-and-down directional position of the slide 2 and the magnitude of drive current. As shown in FIG. 6, through the aforementioned processing, the NC device 10 is capable of changing the production speed such that the drive current becomes less than the first threshold.

It should be noted that time period T1 required for a single reciprocation of the slide is longer than the originally set time period (T0 in FIG. 5) due to reduction in production speed.

Figure 7:
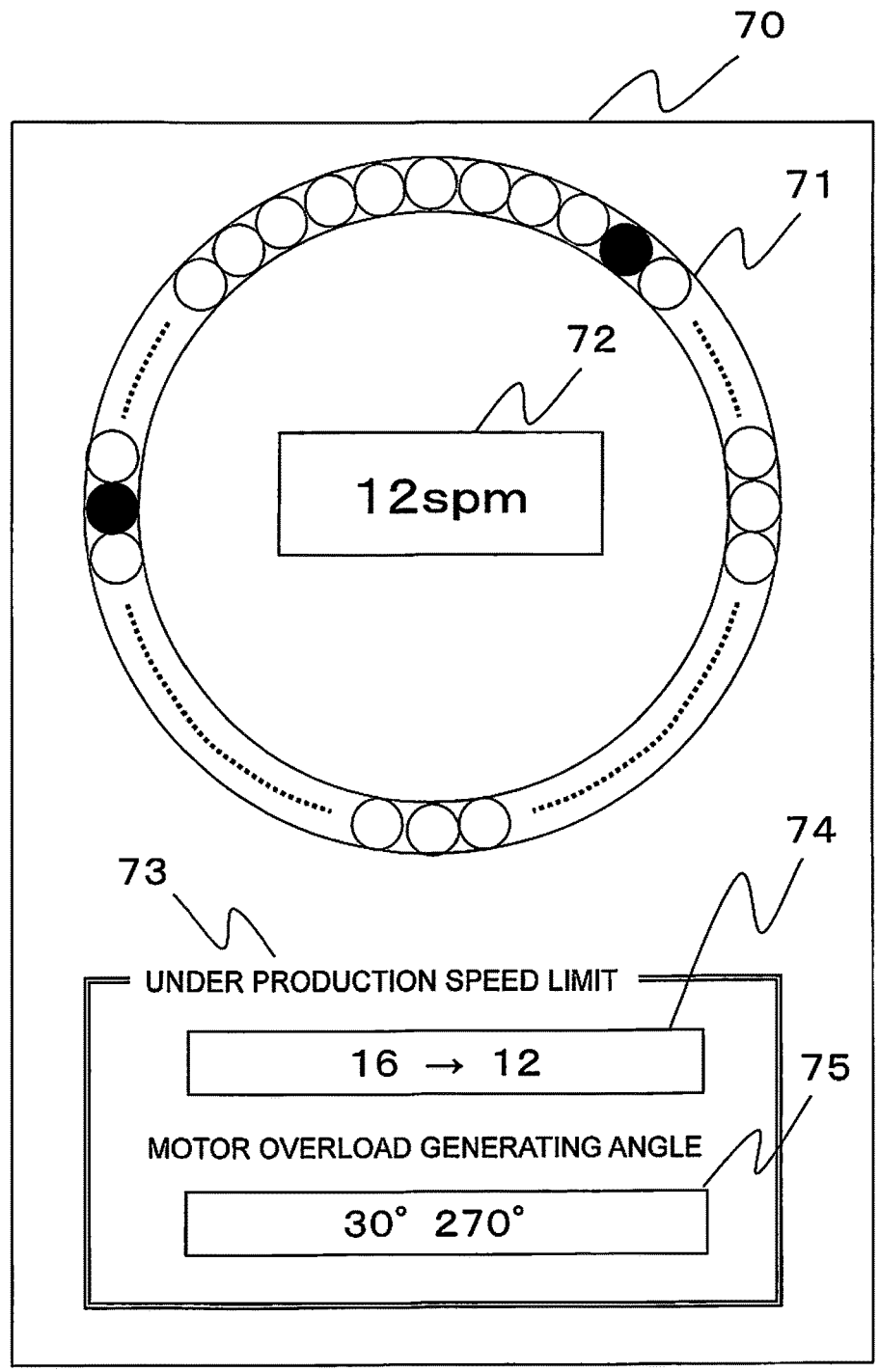
FIG. 7 is a diagram illustrating a screen shown by the display when determination processing and speed change processing are performed.

FIG. 7 is an exemplary picture to be displayed by the display 15 when the present determination processing and the present speed change processing are performed. A display screen 70 includes a roulette displaying part 71, a present production speed displaying part 72, a processing status displaying part 73, a production speed change history displaying part 74 and an overload generating angle displaying part 75.

As described in Japan Laid-open Patent Application Publication No. 2004-058152, for example, the roulette displaying part 71 is a part for displaying sectors, obtained by dividing a circle of 360 degrees at predetermined angular intervals (of e.g., 5 degrees), in the form of dots that are respectively representative of the sectors. The roulette displaying part 71 is configured to highlight a sector corresponding to the rotational angle θ at which the drive current is greater than or equal to the first threshold. In the example of FIG. 7, the roulette displaying part 71 highlights a sector covering a rotational angle of around 30 degrees and a sector covering a rotational angle of around 270 degrees. In this highlighting, it is preferable to display dots corresponding to the sectors, for instance, with another color or in a blinking manner.

The present production speed displaying part 72 is preferably configured to display the present press production speed in units of strokes per minute (spm). The processing status displaying part 73 is configured to display the present processing status. Specifically, when the speed change processing is being performed, a processing status such as "UNDER PRODUCTION SPEED LIMIT" is displayed as shown in the drawing. By contrast, when the speed change processing is disabled (NO in Steps S3 and S7), a processing status, such as "WITHOUT PRODUCTION SPEED LIMIT" or "UNDER NORMAL OPERATION," is displayed for easily understanding that speed change has not been done.

The production speed change history displaying part 74 is configured to display the history of the production speed set by the operator and the reduced production speed. FIG. 7 shows an exemplary situation that the production speed set by the operator is 16 spm and the reduced production speed is 12 spm. The overload generating angle displaying part 75 is configured to sequentially display the rotational angles θ at which the drive current is greater than or equal to the first threshold. FIG. 7 illustrates a situation that the rotational angles θ are 30 and 270 degrees on the basis of the example of FIG. 5.

FIG. 7 illustrates an example that the speed change processing is enabled (YES in Step S7). When the speed change processing is disabled (NO in Steps S3 and S7), it is preferable to omit display of the production speed change history displaying part 74. On the other hand, when the determination processing is disabled (NO in Step S3), it is preferable to omit display of the processing status displaying part 73, display of the production speed change history displaying part 74 and display of the overload generating angle displaying part 75.

Features

Features of the electric servo press 1 according to the present exemplary embodiment are as follows.

The electric servo press 1 includes the servo motor 3, the servo amplifier 4, a current detecting means or device (the feedback circuit 10e) for detecting the drive current of the servo amplifier 4, a rotational angle detecting means or device for detecting the rotational angle of a rotary motion (the pulse coder 18, the input circuit 10b, and the program for calculating the rotational angle stored in the NC device 10), a speed setting means or device (the display 15) for setting the press production speed by setting correspondence defining the rotary motion, i.e., correspondence between rotational angles and rotational speeds at the rotational angles, a determination means or device (the program stored in the NC device 10) for determining whether or not the drive current is greater than or equal to the first threshold, and a speed changing means or device (the program stored in the NC device 10) for reducing all the rotational speeds set by the speed setting means by an equal ratio when the drive current is greater than or equal to the first threshold. Therefore, the electric servo press 1 is capable of continuing production even when the drive current of the servo motor 3 is greater than or equal to the first threshold. Additionally, with reduction in all the rotational speeds by an equal ratio, production can be continued without changing a method intended by an operator regarding how to move the slide.

The determination means is configured to determine whether or not the drive current detected by the current detecting means is greater than or equal to the first threshold at periodic intervals based on a predetermined number of reciprocating motions. Furthermore, the speed changing means is configured to reduce all the preliminarily set rotational speeds by a predetermined ratio in a stepwise manner on the basis of the determination result of the determination means. Therefore, the electric servo press 1 can regulate the production speed such that the drive current becomes less than the first threshold by inhibiting reduction in production speed as much as possible.

The electric servo press 1 further includes an emergency stop means or device (the emergency stop circuit 11) for stopping the servo motor when the drive current is greater than or equal to the second threshold greater than the first threshold. Accordingly, the electric servo press 1 can stop driving of the servo motor in such a situation that the speed set by the operator is too fast and thus the electric servo press 1 could be broken down when activated without changing the set speed.

The electric servo press 1 further includes a display means or display (the display 15, the overload generating angle displaying part 75) for displaying a rotational angle at which the drive current is greater than or equal to the first threshold. With the means, the operator can be aware of such a rotational angle at which the servo motor load is large, and can change the originally set production speed with reference to the rotational angle.

The display means has the roulette displaying part 71 indicating rotational angles by sectors located on a circumference of a circle, and the roulette displaying part 71 is configured to highlight the sector indicating the rotational angle at which the drive current is greater than or equal to the first threshold. Accordingly, the operator can visually grasp a rotational angle at which the servo motor load is large.

The roulette displaying part 71 is configured to display the sector to be highlighted by changing the color of the sector to be different from the color of the other sectors. Alternatively, the roulette displaying part 71 is configured to display the sector to be highlighted by blinking the sector. The configuration makes it easy for an operator to visually grasp a rotational angle at which the servo motor load is large.

The display means (the display 15) includes the processing status displaying part 73 configured to display that the press production speed has been changed by the speed changing means, and the production speed change history displaying part 74 configured to display the press production speed set by the speed setting means and the press production speed changed by the speed changing means. With these means, the operator can be aware of that the production speed has been changed and to what extent the production speed has been changed (whether or not the production speed has not been remarkably changed).

The electric servo press 1 further includes a mode setting means or device (the radio buttons 31 to 33) for setting an action of the determination means and an action of the speed changing means to be enabled or disabled. With the means, the operator can perform setting of, for instance, disabling the speed changing means when in a hurry for production, and thus, can perform setting in accordance with a situation of production.

The mode setting means is capable of selecting any one of the first mode (the radio button 31) for disabling both of the action of the determination means and the action of the speed changing means, the second mode (the radio button 32) for enabling only the action of the determination means and causing the display means to display the rotational angle at which the drive current is greater than or equal to the first threshold, and the third mode (the radio button 33) for enabling both of the action of the determination means and the action of the speed changing means. Therefore, even when in a hurry for production, the operator can select the second mode, and hence, can modify the production speed at an early stage.

The electric servo press 1 further includes a threshold setting means or device (the text box 34) for setting the first threshold. With the means, even when an overloaded operation of the servo motor 3 continues and the performance of the servo motor 3 degrades, the product life of the electric servo press 1 can be extended by changing the first threshold.

The threshold setting means includes means for authenticating an operator. With the means, a person allowed to set the first threshold can be limited to, for instance, the maintenance operator of the electric servo press 1.

The ratio of the speed to be reduced by the speed changing means is 1%. With the configuration, the electric servo press 1 is capable of regulating the production speed such that the drive current becomes less than the first threshold by inhibiting reduction in production speed as much as possible. Moreover, it has been empirically known that the drive current can be remarkably reduced when the aforementioned ratio of the rotational speed is reduced by 5%. Hence, the electric servo press 1 is capable of changing the production speed quickly (in at most 5 strokes or so) such that the drive current becomes less than the first threshold.

Modifications

The present invention is not limited to the exemplary embodiment as described above, and a variety of changes or modifications can be made without departing from the scope of the present invention.

In the aforementioned exemplary embodiment, each of Steps S3 and S7 is configured to be performed every time the reciprocating motion of the slide 2 is performed a predetermined number of times. However, after the processing of each of Steps S3 and S7 is performed once, the processing may be omitted by utilizing the processing result. Alternatively, the processing of each of Steps S3 and S7 may be completely omitted.

The following method has been described as a method of reducing the press production speed: the processing of Steps S1 to S8 are performed every time the reciprocating motion in the press action is performed a predetermined number of times (preferably once), and when the drive current is greater than or equal to the first threshold, the speeds in the respective steps, set in the production speed setting operation, are reduced by a predetermined ratio. However, another method may be employed. For example, the press production speed may be changed by a method of increasing a ratio, by which the speeds in the respective steps are reduced, in proportion to increase in the maximum value of a time period (t1, t2 in FIG. 5) during which the drive current is greater than or equal to the first threshold.

In the aforementioned exemplary embodiment, the roulette displaying part 71 has been exemplified as a method of displaying a rotational angle at which the drive current is greater than or equal to the first threshold. However, another method may be employed. For example, instead of the roulette displaying part 71, the display 15 may be configured to display a chart as shown in FIG. 5 or a chart that the horizontal axis indicates rotational angles whereas the vertical axis indicates drive currents corresponding to the rotational angles.

In the aforementioned exemplary embodiment, in Steps S6 and S8, the rotational angle θ at which the drive current is greater than or equal to the first threshold and the pre-reduced and post-reduced production speeds are configured to be displayed. However, display of these elements may be omitted. In other words, only regulation of the press production speed may be configured to be performed.

In the aforementioned exemplary embodiment, the text box 34 for setting the first threshold is configured to be displayed in the picture 30 for mode setting, but may be displayed in another picture. Moreover, the processing status displaying part 73, the production speed change history displaying part 74 and the overload generating angle displaying part 75 may be configured to be displayed in one or more pictures different from the roulette displaying part 71 and the present production speed displaying part 72.

In the aforementioned exemplary embodiment, the emergency stop circuit 11, the open/close equipment 12, the switch 21 and the deceleration device 6 may be omitted. Likewise, the processing of Step S2 may be omitted.

The present invention is useful for electric servo presses configured to convert the rotational driving force of a servo motor into the up-and-down reciprocating motion of a slide.

The invention claimed is:

1. A press machine configured to convert a rotary motion produced by a drive source into a reciprocating motion of a slide through a power conversion mechanism, comprising:
   a servo motor configured to provide the rotary motion;
   a servo amplifier configured to supply a drive current to the servo motor;
   a current detector configured to detect the drive current;
   a rotational angle detector configured to detect a rotational angle of the rotary motion; and
   a controller programmed to
      receive input to set a press production speed by setting a correspondence between rotational angles and rotational speeds at the rotational angles, the correspondence defining the rotary motion,
      determine whether or not the drive current detected by the current detector is greater than or equal to a first threshold, and
      revise the correspondence to reduce all the rotational speeds corresponding to the rotational angles by a prescribed ratio when the drive current detected by the current detector is greater than or equal to the first threshold, the prescribed ratio being the same for all the rotational speeds and the prescribed ratio being smaller than 100%.

2. The press machine recited in claim 1, further comprising
   a display configured to display a rotational angle at which the drive current is greater than or equal to the first threshold.

3. The press machine recited in claim 2, wherein the display includes a roulette displaying part indicating the rotational angle by a sector located on a circumference of a circle, and
   the roulette displaying part is configured to highlight the sector indicating the rotational angle at which the drive current is greater than or equal to the first threshold.

4. The press machine recited in claim 3, wherein the roulette displaying part is configured to display the sector to be highlighted by changing a color of the sector.

5. The press machine recited in claim 3, wherein the roulette displaying part is configured to display the sector to be highlighted by blinking the sector.

6. The press machine recited in claim 2, wherein the display includes
   a status displaying part being configured to display that the press production speed has been reduced, and
   a production speed change history displaying part being configured to display the press production speed set based on the received input and the reduced press production speed obtained by revising the correspondence.

7. The press machine recited in claim 2, wherein the controller is configured to receive input to set any one of
   a first mode in which the controller disables both the determination of whether or not the drive current detected by the current detector is greater than or equal to the first threshold and the revision of the correspondence,
   a second mode in which the controller disables only the determination of whether or not the drive current detected by the current detector is greater than or equal to the first threshold and causes the display to display the rotational angle at which the drive current is greater than or equal to the first threshold, and
   a third mode in which the controller enables both the determination of whether or not the drive current detected by the current detector is greater than or equal to the first threshold and the revision of the correspondence.

8. The press machine recited in claim 1, wherein the controller is configured to to enable the determination of whether or not the drive current detected by the current detector is greater than or equal to the first threshold and the revision of the correspondence to be selectively enabled or disabled.

9. The press machine recited in claim 1, wherein the controller is configured to receive input to set the first threshold.

10. The press machine recited in claim 9, wherein the controller is configured to receive input for authenticating an operator before receiving the input to set the first threshold.

11. A press machine configured to convert a rotary motion produced by a drive source into a reciprocating motion of a slide through a power conversion mechanism, comprising:
    a servo motor configured to provide the rotary motion;
    a servo amplifier configured to supply a drive current to the servo motor;
    a current detector configured to detect the drive current;
    a rotational angle detector configured to detect a rotational angle of the rotary motion; and
    a controller programmed to
       receive input to set a press production speed by setting a correspondence between rotational angles and rotational speeds at the rotational angles, the correspondence defining the rotary motion,
       determine whether or not the drive current detected by the current detector is greater than or equal to a first threshold, and
       determine whether or not the drive current detected by the current detector is greater than or equal to the first threshold until the reciprocating motion is performed a predetermined number of times after starting of the reciprocating motion, and
       revise the correspondence to reduce all the rotational speeds by a predetermined ratio after the reciprocating motion has been performed the predetermined number of times when the drive current is determined to be greater than or equal to the first threshold, the predetermined ratio being the same for all the rotational speeds.

12. The press machine recited in claim 11, wherein
    the controller is configured to determine whether or not the drive current detected by the current detector is greater than or equal to the first threshold until the reciprocating motion is performed the predetermined number of times after all the rotational speeds have been reduced by the predetermined ratio, and
    when the controller determines that the drive current is greater than or equal to the first threshold, the controller reduces all the rotational speeds again by the predetermined ratio after the reciprocating motion is performed the predetermined number of times.

13. The press machine recited in claim 11, wherein the predetermined ratio is 1%.

14. A press machine configured to convert a rotary motion produced by a drive source into a reciprocating motion of a slide through a power conversion mechanism, comprising:

a servo motor configured to provide the rotary motion;
a servo amplifier configured to supply a drive current to the servo motor;
a current detector configured to detect the drive current;
a rotational angle detector configured to detect a rotational angle of the rotary motion;
a controller programmed to
    receive input to set a press production speed by setting a correspondence between rotational angles and rotational speeds at the rotational angles, the correspondence defining the rotary motion,
    determine whether or not the drive current detected by the current detector is greater than or equal to a first threshold, and
    revise the correspondence to reduce all the rotational speeds corresponding to the rotational angles by a predetermined ratio when the drive current detected by the current detector is greater than or equal to the first threshold, the predetermined ratio being the same for all the rotational speeds; and
an emergency stop circuit configured to stop electric power supply to the servo motor when the drive current is greater than or equal to a second threshold greater than the first threshold.

15. A method of controlling a press machine, the press machine being configured to convert a rotary motion produced by a servo motor into a reciprocating motion of a slide through a power conversion mechanism, the press machine including a servo amplifier supplying a drive current to the servo motor, the method comprising the steps of:
    setting a press production speed by setting a correspondence between rotational angles and rotational speeds at the rotational angles, the correspondence defining the rotary motion;
    performing a press action in accordance with the press production speed;
    detecting the drive current;
    determining whether or not the detected drive current is greater than or equal to a first threshold; and
    revising the correspondence to reduce all the set rotational speeds by a prescribed ratio when the detected drive current is greater than or equal to the first threshold, the prescribed ratio being the same for all the rotational speeds and the prescribed ratio being smaller than 100%.

* * * * *